United States Patent Office 3,746,736
Patented July 17, 1973

3,746,736
PROCESS FOR PREPARING ALPHA, BETA, UNSATURATED CARBONYL COMPOUNDS
Shinzaburo Sumimoto and Akira Takase, Osaka Prefecture, Japan assignors to Shionogi & Co., Ltd., Osaka, Japan
No Drawing. Continuation-in-part of abandoned application Ser. No. 796,162, Feb. 3, 1969. This application Mar. 19, 1971, Ser. No. 126,279
Claims priority, application Japan, Feb. 19, 1968, 43/10,688, 43/10,689
Int. Cl. C07c 69/00, 69/66
U.S. Cl. 260—463     6 Claims

ABSTRACT OF THE DISCLOSURE

Cis and trans isomers of $\alpha,\beta$-unsaturated carbonyl compounds are separately obtained in a controlled output ratio by the reactions of active methylene compounds which are likely to be enolized with pyrocarbonate esters. Furthermore, pure cis isomers of said $\alpha,\beta$-unsaturated carbonyl compounds are obtained by decomposing trans isomers in the mixtures of isomers by the action of aliphatic secondary amines, preferably, diisobutylamine.

BACKGROUND OF THE INVENTION

Field of the invention

This application is a continuation-in-part of copending application, Ser. No. 796,162, filed Feb. 3, 1969, now abandoned.

The present invention generally relates to a process for preparing $\alpha,\beta$-unsaturated carbonyl compounds which are useful as industrial materials. Particularly, it concerns a process for obtaining cis and trans isomers of the compounds separately and in a controlled output ratio. Furthermore, the present invention relates to a process for obtaining a pure cis isomer of such compounds or at least enrich the cis constituent in the mixture of the cis and trans $\alpha,\beta$-unsaturated carbonyl compounds.

The separate obtaining of the respective isomers, especially, that of the cis isomer is considered to be essential when the products are used as intermediates for pharmaceuticals or raw materials for polymers.

Description of prior art

An unsaturated carboalkoxy ester, one of these being an $\alpha,\beta$-unsaturated carbonyl compound, can, as has hitherto been known, be produced by, for instance, the reaction of a sodioacetate ester or potassium acetylacetone with ethyl chloroformate [Beil. 3 H 8, 3 H 347]. These processes, however, are insufficiently available because the isolation of cis and trans isomers thereof has not yet been proposed.

Only a c-acyl compound such as diethyl acetylmalonate is obtainable by the reaction of a malonate with acetylchloride in the presence of magnesium, but recovering of the o-acyl compound is not accomplished [Beil. 3 E III 1374].

On the other hand, o-acyl compounds are considered to be useful as intermediates for pharmaceuticals or as raw materials for polymers as well as c-acyl compounds. Accordingly an effective and advantageous process for obtaining o-acyl compounds has long been awaited.

SUMMARY OF THE INVENTION

It is, therefore, the primary object of the present invention to provide an excellent process for preparing $\alpha,\beta$-unsaturated carbonyl compounds.

It is another object of the present invention to provide an effective and advantageous process for separately obtaining the respective isomers of said $\alpha,\beta$-unsaturated carbonyl compounds in a controlled output ratio.

It is a further object of the present invention to provide a process for preparing the pure cis isomers of said $\alpha,\beta$-unsaturated carbonyl compounds.

It is a still further object of the present invention to provide a process for enriching the cis constituent in the mixture of said cis and trans isomers of said compound.

Other objects and attendant advantages of the present invention will be apparent to those who are conversant with the art to which the present invention pertains by the following detailed description of the present invention and the appended claims.

DESCRIPTION OF PREFERRED EMBODIMENT

According to one aspect of the present invention, $\alpha,\beta$-unsaturated carbonyl compounds of the formula:

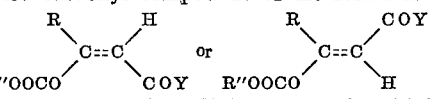

wherein, represents R' or OR', and R, R' and R" each represents a methyl or an ethyl group of the same kind or different kind, are prepared by reacting an active methylene compound of the formula:

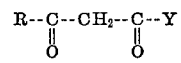

wherein, Y and R have the same meanings as above, with a pyrocarbonate ester of the formula: $O(COOR'')_2$ wherein, R" has the same significance as above.

Although a process reacting chlorocarbonate with a dehydrochlorinating agent is known, no definite means of separating cis and trans isomers is known.

The present inventors have now discovered the fact that those which are not enolized, for instance, malonate esters, malononitrile and the like, of various active methylene compounds, are c-alkyloxycarbonylized by an alkoxycarbonylizing agent, conversely, those which are likely to be enolized, for instance, alkyl acylacetates such as ethyl acetoacetate and alkyldiketones such as acetyl acetone, are o-alkyloxycarbonylized by the same agent.

Therefore, those active methyelne compounds which are likely to be enolized, are considered to be suitable for the starting material of the present invention and the reactions of these compounds with pyrocarbonate esters can be elucidated as:

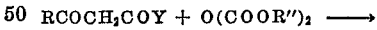

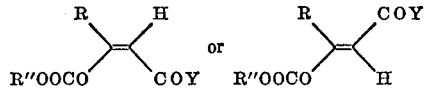

wherein, R, R" and Y have the same significance as mentioned above.

The reaction can successfully be carried out at a temperature ranging from 0° C. to 150° C. for a time period up to 8 hours, and in the presence of at least one substance selected from the group consisting of an alkali carbonate, an organic basic solvent and sodium hydride.

This reaction can also be performed under a stepwise heating condition, for instance at 0–5° C. for 1.5 hours and thereafter at 23° for 3 hours.

The $\alpha,\beta$-unsaturated carbonyl compounds prepared by the process in accordance with the present invention are now confirmed as will be summarized in the following tables: (in the cases of $R=CH_3$)

TABLE 1

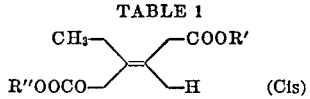

(Cis)

| R'/R'' | $C_2H_5/C_2H_5$ | $CH_3/C_2H_5$ | $C_2H_5/CH_3$ | $CH_3/CH_3$ |
| --- | --- | --- | --- | --- |
| Boiling point, °C./mm. Hg | 73–75/1 | 75–76/3 | 94/4.5 | 93/8.5 |
| $n_D$, 27.5 | 1.4391 | 1.4408 | 1.4406 | 1.4424 |
| Analysis; | | | | |
| Calculated: | | | | |
| C | 53.46 | 51.06 | 51.06 | 48.27 |
| H | 6.98 | 6.43 | 6.43 | 5.79 |
| Found: | | | | |
| C | 53.69 | 51.15 | 51.10 | 48.09 |
| H | 6.98 | 6.48 | 6.44 | 5.80 |
| Molecular weight: | | | | |
| Calculated | 202.2 | | | |
| Found | 206 | | | |
| $\lambda_{max}$.(n-heptane) m$\mu$ ($\epsilon$) | 214(14100) | 214(13670) | 213.5(13410) | 214(13290) |
| NMR $\tau$ value [1] (carbon tetrachloride) | 7.65 / 4.31 | 7.64 / 6.34 / –CH$_2$– 5.79 / –CH$_3$– 8.67 / 4.29 | 7.64 / 6.20 / –CH$_2$– 5.87 / –CH$_3$ 8.74 / 4.29 | 7.64 / 6.32 / 6.20 / 4.27 |
| Relative retention time on G.C.[2] | 1.57 | 1.27 | 1.31 | 1.06 |

[1] Cis and trans isomers of R'=R''=$C_2H_5$ are determined by the Overhauser effect.
[2] Condition of analysis—Gas chromatograph=Shimazu GC-1B; PEG 6000=Chromosorb W(60–80 mesh, treated with HCl and silicone (dimethyl dichloro silane)=10:90, Stainless U-tube 4 mm. $\phi$ x 3 m., 150° C.; He=100 ml./min.; Reference material=$C_6H_5COC_2H_5$, 8.3 min.

TABLE 2

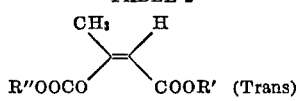

(Trans)

| R'/R'' | $C_2H_5/C_2H_5$ | $CH_3/C_2H_5$ | $C_2H_5/CH_3$ | $CH_3/CH_3$ |
| --- | --- | --- | --- | --- |
| Boiling point, °C./mm. Hg | 111/6.5 | 76/2.5 | 95–98/4.5 | 83–85/4.5 |
| $n_D$, 27.5 | 1.4388 | 1.4399 | 1.4399 | 1.4412 |
| Analysis; | | | | |
| Calculated: | | | | |
| C | 53.46 | 51.06 | 51.06 | 48.27 |
| H | 6.98 | 6.43 | 6.43 | 5.79 |
| Found: | | | | |
| C | 53.38 | 51.07 | 51.20 | 48.14 |
| H | 7.06 | 6.58 | 6.47 | 5.87 |
| Molecular weight: | | | | |
| Calculated | 202.2 | | | |
| Found | 211 | | | |
| $\lambda_{max}$.(n-heptane)m$\mu$($\epsilon$) | 210.5(12400) | 211(12220) | 210.5(12580) | 210.5(12290) |
| NMR $\tau$ value [1] (carbon tetrachloride) | 8.00 / 4.51 | 7.99 / 4.52 / –CH$_2$– 5.79 / –CH$_3$ 8.64 / 6.38 | 7.98 / 4.52 / CH$_2$– 5.91 / CH$_3$ 8.76 / 6.19 | 7.98 / 4.50 / 6.20 / 6.38 |
| Relative retention time on G.C.[2] | 2.19 | 1.84 | 1.93 | 1.60 |

[1] Cis and trans isomers of R'=R''=$C_2H_5$ are determined by the Overhauser effect.
[2] Condition of analysis—Gas chromatograph=Shimazu GC-1B; PEG 6000=Chromosorb W(60–80 mesh, treated with HCl and silicone (dimethyl dichloro silane)=10:90, Stainless U-tube 4 mm. $\phi$ x 3 m., 150° C.; He=100 ml./min.; Reference material=$C_6H_5COC_2H_5$, 8.3 min.

In addition to the above, the present inventors have further discovered that these $\alpha,\beta$-unsaturated carbonyl compounds are decomposable by the action of secondary amines as will be illustrated in the following equation:

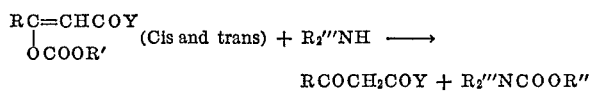

wherein, R, R'' and Y are having the same significances as aforedescribed and R''' represents an alkyl group, and that the secondary amines selectively attack the trans isomer in the mixture of these cis and trans $\alpha,\beta$-unsaturated carbonyl compounds.

Therefore, according to another feature of the present invention, a mixture of cis and trans $\alpha,\beta$-unsaturated carbonyl compounds of the above tables is treated by aliphatic secondary amines to obtain a pure cis isomer or at least to enrich the cis isomer in the mixture. This treatment can successfully be performed at room temperature (20–27° C.) for a time period ranging from 5 to 8 hours. Although any aliphatic amines can be employed as the amines used in the above treatment, diisobutylamine is found to be the most suitable for this purpose of selective decomposition.

In the following paragraphs, a more detailed explanation of the present invention will be made by way of examples:

EXAMPLES 1–2

Ethyl acetoacetate was treated with diethyl pyrocarbonate at 100° C. for 3 hours. After cooling, the carbonate salt formed in the reaction mixture was filtered out and the mixture was distilled for separating the products from the unaltered ethyl acetoacetate.

The $\alpha,\beta$-unsaturated carbonyl compounds of Tables 1 and 2 are obtained as products.

Other reaction conditions and the obtained results are summarized in the following table.

TABLE 3

| Examples numbered as | 1 | 2 |
|---|---|---|
| Ethyl acetoacetate, g./mol | 1.30/0.01 | 1.30/0.01 |
| Diethyl pyrocarbonate, g./mol | 3.24/0.02 | 1.78/0.011 |
| $K_2CO_3$ catalyst, mg./mol | | 13.8/1×10⁻⁴ |
| Yield, percent | 62.87 | 60.89 |
| Output ratio, trans/cis | 94.33/5.13 | 71.87/28.13 |

EXAMPLES 3–7

In order to confirm the advantage of the alkali carbonate catalyst used in Example 2 on the performance of the reaction, a series of experiments, whose details will be summarized in the following table, were carried out employing carbonates of potassium, sodium and lithium.

Six point five one (6.51) grams (0.050 mole) of ethyl acetoacetate was participated in each of these reactions, in which the duration was 3 hours and the molar ratio of ethyl acetoacetate:diethyl pyrocarbonate:alkali carbonate was $1.0:2.0:10^{-2}$.

An after treatment similar to those in Examples 1 and 2 was carried out in each experiment.

TABLE 4

| Examples numbered as | 3 | 4 | 5 | 6 | 7 |
|---|---|---|---|---|---|
| Alkali metal | K | K | | Na | Li |
| Temperature, °C | 60 | 100 | 60 | 60 | 60 |
| Yield calculated by G.C | 95.21 | 44.16 | 19.87 | 95.18 | 42.31 |
| Output ratio: | | | | | |
| Trans | 77.66 | 65.44 | 88.46 | 91.97 | 94.89 |
| Cis | 22.34 | 34.56 | 11.54 | 8.03 | 5.11 |
| Trans/cis | 3.476 | 1.893 | 7.665 | 11.45 | 18.56 |

EXAMPLE 8

The advantages of sodium hydride on the yield of the carbonyl compound was confirmed by the following experiment in which 39.06 g. (0.300 mole) of ethyl acetoacetate was brought into reaction at a molar ratio of the acetate:diethyl pyrocarbonate:sodium hydride of 1.0:2.0:0.95.

After the two stage treatment at 0–5° C. for 1.5 hours, and at room temperature for 3 hours, followed by standing overnight, the mixture was decomposed by water and extracted with benzene, and thereafter the product was dried and distilled.

Cis and trans crops by gas chromatography__g__ 57.0002
Yield based on NaH _____percent__ 98.91
Output ratio:
    trans _____do____ 97.49
    cis _____do____ 2.51
Trans/cis ratio _____ 38.84

EXAMPLES 9–13

Ethyl acetoacetate was treated with diethyl pyrocarbonate in pyridine in order to confirm the effect of varying the molar ratio of the pyridine employed in respect to the ethyl acetoacetate.

The results which will be shown in the following table, were obtained by the reactions carried out employing 13.02 g. (0.100 mole) of ethyl acetoacetate in a molar ratio to the diethyl pyrocarbonate of 0.5 in which, the reaction continued at 60° C. for 3 hours and the pH value of the mixture was thereafter adjusted to 2.5 with hydrochloric acid in order to decompose the diethyl pyrocarbonate.

TABLE 5

| Examples numbered as | 9 | 10 | 11 | 12 | 13 |
|---|---|---|---|---|---|
| Molar ratio of pyridine | 0.2 | 0.5 | 1.0 | 3.0 | 10.0 |
| Overall yield by G.C., percent | 60.93 | 85.83 | 78.31 | 67.20 | 57.67 |
| Output ratio: | | | | | |
| Trans | 10.78 | 12.05 | 10.29 | 11.04 | 11.81 |
| Cis | 89.22 | 87.95 | 89.71 | 88.96 | 88.19 |
| Trans/cis | 0.1203 | 0.1370 | 0.1147 | 0.1241 | 0.1339 |

EXAMPLES 14–18

Reactions similar to those in Examples 9–13 were carried out employing triethylamine in place of pyridine of Examples 9–13 with varying molar ratio. The obtained results are presented in the following table.

TABLE 6

| Examples numbered as | 14 | 15 | 16 | 17 | 18 |
|---|---|---|---|---|---|
| Molar ratio of triethylamine | 0.2 | 0.5 | 1.0 | 3.0 | 10.0 |
| Overall yield by G.C., percent | 91.51 | 89.67 | 87.07 | 90.26 | 92.51 |
| Output ratio: | | | | | |
| Trans | 15.41 | 17.00 | 19.73 | 25.52 | 35.85 |
| Cis | 84.59 | 83.00 | 80.27 | 74.48 | 64.15 |
| Trans/cis | 0.1821 | 0.2048 | 0.2459 | 0.3426 | 0.5588 |

EXAMPLES 19–23

Acetylacetone (10.1 g., 0.010 mole) was treated with diethyl pyrocarbonate in a manner similar to the previously described examples with or without employing catalysts to obtain products whose physical characteristics are presented in the following table.

TABLE 7

|  | (trans) $C_2H_5OOC$–C($CH_3$)=C(H)–$COCH_3$ | (cis) $C_2H_5OOC$–C($CH_3$)=C($COCH_3$)–H |
|---|---|---|
| Boiling point, °C./mm. Hg | 86–88/3.5 | 82–83/3.5 |
| Analysis Calculated: | | |
| C | 55.80 | 55.80 |
| H | 7.03 | 7.03 |
| Found: | | |
| C | 55.82 | 55.72 |
| H | 7.06 | 7.07 |
| $\lambda_{max.}$ (n-heptane) m$\mu$ ($\epsilon$) | 221.5(11950) | 231.0(11610) |
| NMR $\tau$-value (carbon tetrachloride) | 7.97, 4.33, –$CH_2$– 5.77, $CH_3$– 8.63, 7.87 | 7.72, 7.87, –$CH_2$– 5.82, $CH_3$– 8.67, 3.90 |
| Relative retention time on G.C. | 1.58 | 1.12 |

The results are summarized in the following table.

TABLE 8

| Examples numbered as | 19 | 20 | 21 | 22 | 23 |
|---|---|---|---|---|---|
| Diethyl, grams | 17.84 | 17.84 | 17.84 | 32.43 | 32.43. |
| Pyrocarbonate, moles | 0.11 | 0.11 | 0.11 | 0.20 | 0.20. |
| Catalyst | | | $K_2CO_3$ 138 mg. (1×10$^{-3}$ mole) | $Et_3N$, 2.02 g. (0.02 mole) | 50% NaH, 4.56 g. (0.095 mole). |
| Solvent | | | | | Ether 120 ml. |
| Reaction temperature, °C | 120 | 145 | 60 | 60 | 0–5, 27. |
| Condition time, hours | 4 | 4.5 | 3 | 3 | 1.5, 3. |
| Crop, grams | 12.78 | 14.81 | 14.70 | 15.26 | 12.00. |
| Yield, percent | 74.22 | 86.00 | 85.36 | 88.61 | [1] 73.35. |
| Output ratio: | | | | | |
| trans | 92.02 | 69.62 | 70.75 | 38.07 | 96.58. |
| cis | 7.98 | 30.38 | 29.25 | 61.93 | 3.42. |
| Trans/cis | 11.53 | 2.291 | 2.418 | 0.6147 | 28.24. |

[1] Calculated in terms of NaH.

EXAMPLES 24–29

Triethylamine which has proved to exhibit a favorable effect in the experiments, as shown in Table 8, was employed in this series of experiments. Reactions were carried out in the same manner as Examples 19–23, varying the molar ratio of triethylamine to acetylacetone.

The obtained results are summarized in the following table.

TABLE 9

| Examples numbered as | 24 | 25 | 26 | 27 | 28 | 29 |
|---|---|---|---|---|---|---|
| Molar ratio of $Et_3N$ to acetylacetone | 0.05 | 0.20 | 0.50 | 1.00 | 3.00 | 10.00 |
| Yield, overall, percent | 89.41 | 86.89 | 80.44 | 78.05 | 76.92 | 81.72 |
| Yield, trans, percent | 26.89 | 31.53 | 31.42 | 27.90 | 24.28 | 25.21 |
| Yield, cis, percent | 62.52 | 55.36 | 51.02 | 50.15 | 52.64 | 56.51 |
| Output ratio: | | | | | | |
| trans | 30.07 | 36.29 | 36.58 | 35.74 | 31.56 | 30.85 |
| cis | 69.93 | 63.71 | 63.42 | 64.26 | 68.44 | 69.15 |
| Trans/cis | 0.4300 | 0.5696 | 0.5767 | 0.5561 | 0.4611 | 0.4461 |

EXAMPLES 30–37

Three grams of a mixture (cis:trans=91.06:8.94, purity=95.85%) of ethyl ethoxycarbonyloxy-β-crotonate

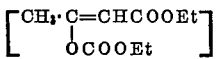

was treated with various alkylamines at 23–25° C. The obtained results are summarized in the following table.

TABLE 10

| Examples numbered as | Dialkyl amines employed | Molar ratio of the amines to the trans[1] isomer | Reaction time (hours) | After the reaction of— | | Remainded/initial, percent | | |
|---|---|---|---|---|---|---|---|---|
| | | | | Cis[2] | Trans | Overall | Cis | Trans |
| 30 | Ethyl | 2.48 | 5 | 94.77 | 5.23 | 85.39 | 88.87 | 49.92 |
| 31 | do | 2.50 | 8 | 94.45 | 5.55 | 83.84 | 86.96 | 52.09 |
| 32 | Isobutyl | 2.50 | 5 | 100 | 0 | 85.63 | 94.04 | 0 |
| 33 | do | 2.53 | 8 | 100 | 0 | 81.04 | 89.00 | 0 |
| 34 | Ethyl | 4.99 | 5 | 97.20 | 2.80 | 60.95 | 65.06 | 19.11 |
| 35 | do | 5.10 | 8 | 97.25 | 2.75 | 59.76 | 63.83 | 18.37 |
| 36 | Isobutyl | 5.02 | 5 | 100 | 0 | 76.62 | 84.14 | 0 |
| 37 | do | 5.04 | 8 | 100 | 0 | 72.13 | 79.21 | 0 |

[1] The molar ratio of cis+trans isomers:$R_2'''NH$ is 1:0.22–0.23 where the molar ratio of trans isomer:$R_2'''NH$ is 1:2.5, and the former is 1:0.45–0.46 where the latter is 1:5.0.
[2] Quantitative analysis by gas chromatography, internal reference method.

EXAMPLE 38

To the ester (88.05 g., 0.417 mole calculated in terms of purity) employed in Examples 30–37, there was introduced 12.06 g. (0.0933 mole which is equivalent to 2.50 molar times to the trans isomer) of diisobutylamine in an ice-cooled condition.

After the reaction mixture was allowed to react at 27° C. for 5 hours, the unaltered amine was distilled off under reduced pressure to obtain oily crude substance (98.96 g.). Gas chromatography by internal reference method of this oily substance proved the complete extinguishment of the trans isomer and the remaining of the cis isomer in 88.24%. The recovery percentage of the cis constituent from the whole ester was 80.34% (residual cis constituent is 67.81 g.). Separation of this crude product into ethyl acetoacetate and ethyl diisobutylurethane by distillation under reduced pressure afforded 59.30 g. of the pure cis isomer fraction, B.P.$_{1.8}$ 79.5–83° C.

EXAMPLES 39–42

Reactions are carried out employing a mixed ester which has a relatively large percentage of trans isomer (trans:cis=35.35:64.65) and diisobutylamine. Conditions employed and results obtained are summarized in the following table.

TABLE 11

| Examples numbered as— | Quantities of added iso-$Bu_2NH$, molar ratio to— | | Reaction condition at— | | After the reaction of— | | Remainded/initial, percent | | |
|---|---|---|---|---|---|---|---|---|---|
| | Both constituents | Trans constituent | Temperature, °C | Time, hours | Cis | Trans | Overall | Cis | Trans |
| 39 | 0.53 | 1.50 | 23 | 4 | 93.79 | 6.21 | 48.62 | 70.54 | 8.54 |
| 40 | 0.71 | 2.00 | 23 | 2 | 96.31 | 3.69 | 43.77 | 65.21 | 4.57 |
| 41 | 0.71 | 2.00 | 23 | 4 | 96.91 | 3.09 | 43.26 | 64.85 | 3.78 |
| 42 | 0.71 | 2.00 | 25–26 | 6 | 97.66 | 2.34 | 36.26 | 54.78 | 2.41 |

What is claimed is:
1. A process for preparing cis, trans α,β-unsaturated carbonyl compounds of the formula:

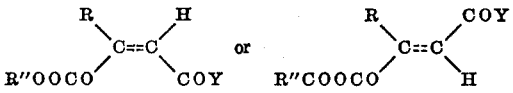

wherein, Y represents R' or OR', and R, R' and R'' each represents a methyl or an ethyl group, comprising reacting an active methylene compound of the formula:

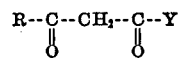

wherein, Y and R have the same meanings as above, with pyrocarbonate esters of the formula: $O(COOR'')_2$, wherein R'' has the same significance as above, at a temperature ranging from 0° C. to 150° C. for a time period up to 8 hours, and in the presence of at least one substance selected from the group consisting of alkali carbonate, organic basic solvent and sodium hydride.

2. A process as claimed in claim 1, wherein ethyl acetoacetate is employed as the active methylene compound.

3. A process as claimed in claim 1, wherein acetylacetone is employed as the active methylene compound.

4. A process for preparing a cis isomer from a mixture of cis and trans α,β-unsaturated carbonyl compounds of the formulae:

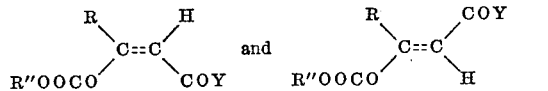

wherein, Y represents R' or OR', and R, R' and R'' each represents a methyl or an ethyl group, comprising treating said mixture with an aliphatic secondary amine at room temperature for a time period ranging from 5 to 8 hours.

5. A process as claimed in claim 4, wherein said α,β-unsaturated carbonyl compound is ethyl ethoxycarbonyloxy-β-crotonate.

6. A process as claimed in claim 4, wherein diisobutylamine is employed as the aliphatic secondary amine.

References Cited

Matzner et al.: Chemical Reviews 64(6), pp. 666–7 (1964).

Chemical Abstracts, vol. 62, 7674(a) (1965).

LEWIS GOTTS, Primary Examiner

D. G. RIVERS, Assistant Examiner

U.S. Cl. X.R.

260—482 C